(12) United States Patent
Matsen et al.

(10) Patent No.: US 11,077,625 B2
(45) Date of Patent: Aug. 3, 2021

(54) THERMOPLASTIC WELDING APPARATUS AND RELATED METHODS

(71) Applicant: The Boeing Company, Chicago, IL (US)

(72) Inventors: Marc R. Matsen, Seattle, WA (US); Mark A. Negley, Bellevue, WA (US); William Preston Geren, Shoreline, WA (US); Robert Miller, Fall City, WA (US)

(73) Assignee: THE BOEING COMPANY, Chicago, IL (US)

( * ) Notice: Subject to any disclaimer, the term of this patent is extended or adjusted under 35 U.S.C. 154(b) by 584 days.

(21) Appl. No.: 15/411,589

(22) Filed: Jan. 20, 2017

(65) Prior Publication Data

US 2017/0165902 A1  Jun. 15, 2017

Related U.S. Application Data

(62) Division of application No. 13/109,061, filed on May 17, 2011, now Pat. No. 9,586,362.

(51) Int. Cl.
*B29C 65/36* (2006.01)
*B29C 65/00* (2006.01)
(Continued)

(52) U.S. Cl.
CPC ...... *B29C 65/3676* (2013.01); *B29C 65/3612* (2013.01); *B29C 65/3644* (2013.01);
(Continued)

(58) Field of Classification Search
CPC ............ B29C 65/3676; B29C 65/3612; B29C 65/3644; B29C 65/3668; B29C 66/00145;
(Continued)

(56) References Cited

U.S. PATENT DOCUMENTS 3,730,804 A  5/1973  Dickey
4,521,659 A  6/1985  Buckley et al.
(Continued)

FOREIGN PATENT DOCUMENTS

JP   H06509293   10/1994
JP   09129429    5/1997
(Continued)

OTHER PUBLICATIONS

Canadian Intellectual Property Office, "Examination Report," issued in connection with Canadian Patent Application No. 2,830,672, dated Feb. 20, 2018, 10 pages.
(Continued)

*Primary Examiner* — Michael N Orlando
*Assistant Examiner* — Elizabeth Bradford
(74) *Attorney, Agent, or Firm* — Hanley, Flight & Zimmerman, LLC

(57) ABSTRACT

Thermoplastic welding apparatus and related methods are disclosed. An example method includes providing a smart susceptor between composite parts that are to be joined via thermoplastic welding. The example method includes positioning the composite parts and the smart susceptor on a tooling surface within a cavity of a tooling apparatus and applying a seal to the composite parts and the tooling surface to form a vacuum chamber between the composite parts and the tooling surface at a welding joint of the composite parts; producing a magnetic field at the welding joint. The example method includes providing a vacuum in the vacuum chamber during a welding operation.

19 Claims, 4 Drawing Sheets

(51) Int. Cl.
*H05B 6/10* (2006.01)
*B29L 31/30* (2006.01)

(52) U.S. Cl.
CPC .... *B29C 65/3668* (2013.01); *B29C 66/00145* (2013.01); *B29C 66/1122* (2013.01); *B29C 66/41* (2013.01); *B29C 66/474* (2013.01); *B29C 66/524* (2013.01); *B29C 66/721* (2013.01); *B29C 66/7392* (2013.01); *B29C 66/73921* (2013.01); *B29C 66/8126* (2013.01); *H05B 6/105* (2013.01); *B29C 66/7212* (2013.01); *B29C 66/7394* (2013.01); *B29C 66/8122* (2013.01); *B29C 66/81457* (2013.01); *B29K 2905/12* (2013.01); *B29K 2995/0008* (2013.01); *B29L 2031/3076* (2013.01); *H05B 2206/023* (2013.01)

(58) Field of Classification Search
CPC ... B29C 66/1122; B29C 66/41; B29C 66/474; B29C 66/524; B29C 66/721; B29C 66/7392; B29C 66/73921; B29C 66/8126; H05B 6/105
USPC ..................................................... 156/376.7
See application file for complete search history.

(56) References Cited

U.S. PATENT DOCUMENTS

| | | |
|---|---|---|
| 5,182,427 A | 1/1993 | McGaffigan |
| 5,240,542 A | 8/1993 | Miller et al. |
| 5,313,037 A | 5/1994 | Hansen et al. |
| 5,530,227 A | 6/1996 | Matsen et al. |
| 5,556,565 A | 9/1996 | Kirkwood et al. |
| 5,624,594 A | 4/1997 | Matsen et al. |
| 5,641,422 A | 6/1997 | Matsen et al. |
| 5,645,744 A | 7/1997 | Matsen et al. |
| 5,710,414 A | 1/1998 | Matsen et al. |
| 5,723,849 A | 3/1998 | Matsen et al. |
| 5,728,309 A | 3/1998 | Matsen et al. |
| 5,847,375 A | 12/1998 | Matsen et al. |
| 6,040,563 A | 3/2000 | Matsen et al. |
| 6,142,520 A | 11/2000 | Lino et al. |
| 6,528,771 B1 | 3/2003 | Matsen et al. |
| 6,566,635 B1 | 5/2003 | Matsen et al. |
| 6,884,975 B2 | 4/2005 | Matsen et al. |
| 6,884,976 B2 | 4/2005 | Matsen et al. |
| 8,980,029 B1 | 3/2015 | Nigro et al. |
| 9,586,362 B2 | 3/2017 | Matsen et al. |
| 2004/0099660 A1 | 5/2004 | Matsen et al. |
| 2005/0035115 A1 | 2/2005 | Anderson et al. |
| 2012/0291948 A1 | 11/2012 | Matsen et al. |

FOREIGN PATENT DOCUMENTS

| | | |
|---|---|---|
| WO | 9302849 | 2/1993 |
| WO | 9821023 | 5/1998 |
| WO | 2012158293 | 11/2012 |

OTHER PUBLICATIONS

Canadian Intellectual Property Office, "Office Action," issued in connection with Canadian Patent Application No. 2,830,672, dated May 12, 2017, 11 pages.
International Searching Authority, "International Search Report," issued in connection with PCT Patent Application No. PCT/US2012/033794, dated Jul. 25, 2012, 6 pages.
International Searching Authority, "Written Opinion," issued in connection with PCT Patent Application No. PCT/US2012/033794, dated Jul. 25, 2012, 6 pages.
State Intellectual Property Office of the People'S Republic of China, "First Office Action," issued in connection with Chinese Patent Application No. 201280023719.6, dated Mar. 27, 2015, 23 pages.
United States Patent and Trademark Office, "Non-Final Office Action," issued in connection with U.S. Appl. No. 13/109,061, dated Jun. 27, 2012, 24 pages.
United States Patent and Trademark Office, "Final Office Action," issued in connection with U.S. Appl. No. 13/109,061, dated Jan. 23, 2013, 22 pages.
United States Patent and Trademark Office, "Non-Final Office Action," issued in connection with U.S. Appl. No. 13/109,061, dated Apr. 24, 2014, 15 pages.
United States Patent and Trademark Office, "Final Office Action," issued in connection with U.S. Appl. No. 13/109,061, dated Feb. 26, 2015, 11 pages.
United States Patent and Trademark Office, "Advisory Action," issued in connection with U.S. Appl. No. 13/109,061, dated Jun. 19, 2015, 6 pages.
United States Patent and Trademark Office, "Notice of Allowance," issued in connection with U.S. Appl. No. 13/109,061, dated Jul. 31, 2015, 28 pages.
Hamilton Precision Methals, Technical Data Sheet, accessed on May 2, 2017, [http://www.hpmetals.com/download/Moly-Permalloy.pdf], Feb. 28, 1991, 2 pages.
Canadian Intellectual Property Office, "Office Action", issued in connection with Canadian Patent Application No. 2,830,672, dated Jul. 7, 2016, 4 pages.
Japanese Patent Office, "Notice of Reasons for Rejection," issued in connection with Japanese Patent Application No. 2014-511371, dated Dec. 22, 2015, 6 pages.
State Intellectual Property Office of the People'S Republic of China, "Notification of Third Office Action," issued in connection with Chinese Patent Application No. 201280023719.6, dated Jan. 18, 2016, 7 pages.
State Intellectual Property Office of the People'S Republic of China, "Notification of Second Office Action," issued in connection with Chinese Patent Application No. 201280023719.6, dated Sep. 24, 2015, 16 pages.
Canadian Intellectual Property Office, "Office Action," issued in connection with Canadian Patent Application No. 2,830,672, dated Oct. 16, 2015, 4 pages.
United States Patent and Trademark Office, "Notice of Allowance," issued in connection with U.S. Appl. No. 13/109,061, dated Dec. 16, 2016, 21 pages.
United States Patent and Trademark Office, "Final Office Action," issued in connection with U.S. Appl. No. 13/109,061, dated Aug. 22, 2016, 14 pages.
United States Patent and Trademark Office, "Non-Final Office Action," issued in connection U.S. Appl. No. 13/109,061, dated Jan. 20, 2016, 22 pages.
United States Patent and Trademark Office, "Advisory Action," issued in connection with U.S. Appl. No. 13/109,051, dated Jul. 22, 2013, 2 pages.
United States Patent and Trademark Office, "Final Office Action," issued in connection with U.S. Appl. No. 13/109,051, dated May 1, 2013, 17 pages.
United States Patent and Trademark Office, "Final Office Action," issued in connection with U.S. Appl. No. 13/109,051, dated Feb. 25, 2014, 29 pages.
United States Patent and Trademark Office, "Non-Final Office Action," issued in connection with U.S. Appl. No. 13/109,051, dated Jan. 4, 2013, 40 pages.
United States Patent and Trademark Office, "Non-Final Office Action," issued in connection with U.S. Appl. No. 13/109,051, dated Sep. 12, 2013, 23 pages.
United States Patent and Trademark Office, "Non-Final Office Action," issued in connection with U.S. Appl. No. 13/109,051, dated May 22, 2014, 30 pages.
United States Patent and Trademark Office, "Notice of Allowance," issued in connection with U.S. Appl. No. 13/109,051, dated Nov. 21, 2014, 31 pages.
United States Patent and Trademark Office, "Requirement for Restriction/Election," issued in connection with U.S. Appl. No. 13/109,051, dated Sep. 27, 2012, 6 pages.

(56) References Cited

OTHER PUBLICATIONS

International Searching Authority, "International Preliminary Report on Patentability," issued in connection with PCT Patent Application No. PCT/US2012/033794, dated Nov. 19, 2013, 7 pages.

Canadian Intellectual Property Office, "Office Action," issued in connection with Canadian Patent Application No. 2,830,672, dated Nov. 22, 2018, 7 pages.

THERMOPLASTIC WELDING APPARATUS AND RELATED METHODS

CROSS-RELATED APPLICATION

This patent arises from a divisional of U.S. patent application Ser. No. 13/109,061, filed on May 17, 2011, entitled "Thermoplastic Welding Apparatus and Related Methods." In addition, this application is related to U.S. patent application Ser. No. 13/109,051, (now U.S. Pat. No. 8,980,029) filed concurrently with U.S. patent application Ser. No. 13/109,061 on May 17, 2011. Both U.S. patent application Ser. No. 13/109,061 and U.S. patent application Ser. No. 13/109,051 are incorporated by reference herein in their entireties.

STATEMENT REGARDING FEDERALLY SPONSORED RESEARCH OR DEVELOPMENT

This invention was made with Government support under contract number DE-FG36-08GO18135 awarded by the United States Department of Energy. The government has certain rights in this invention.

TECHNICAL FIELD

The disclosure generally relates to thermoplastic welding techniques. More particularly, the disclosure relates to a thermoplastic welding apparatus and method in which an induced magnetic field is oriented parallel to the plane of the composite parts being welded and concentrates uniform heating at the joint between the composite parts, preventing or minimizing heating of the parts.

BACKGROUND

Fiber-reinforced organic resin matrix composites have a high strength-to-weight ratio, a high stiffness-to-weight radio and desirable fatigue characteristics that make them increasingly popular in aerospace applications. Therefore, composite materials are increasingly being used in the fabrication of structural components for aircraft.

A variety of techniques are used to join composite structures in aerospace and other applications. These fastening techniques include mechanical fastening, adhesive bonding and thermoplastic welding. Thermoplastic welding has numerous advantages over the other fastening techniques including the ability to join thermoplastic composite components at high speeds and with minimum touch labor and little, if any, pretreatments. The welding interlayer (which includes a susceptor and surrounding thermoplastic resin either coating or sandwiching the susceptor) also can simultaneously take the place of shims which are required in mechanical fastening. Therefore, composite welding promises to be an affordable fastening technique.

In the thermoplastic welding of thermoplastic and thermoset composite parts, the susceptor between the composite parts is heated and, in turn, heats and melts the resin of the parts. The melted resin functions as a hot melt adhesive at the welding interlayer between the parts. Upon subsequent cooling, the resin solidifies and secures the composite parts to each other.

In thermoplastic welding, it is desirable to heat the welding interlayer between the composite parts as uniformly as possible. Thermal uniformity and repeatability, as well as the amount of time necessary to develop acceptable tooling and parameters to meet these acceptable thermal uniformity conditions, has been a primary impediment to utilizing induction welding of thermoplastic composites. Extensive experimentation in developing the parameters has been used in applications in which induction parameters and tooling with heat sinks have been used. Often, however, the thermoplastic welding process is not selected due to these thermal uniformity issues.

Therefore, a thermoplastic welding apparatus and method in which an induced magnetic field is oriented parallel to the plane of the composite parts being welded and concentrates uniform heating at the joint between the composite parts, preventing or minimizing heating of the parts, is needed.

SUMMARY

An example method includes providing a smart susceptor between composite parts that are to be joined via thermoplastic welding; positioning the composite parts and the smart susceptor on a tooling surface within a cavity of a tooling apparatus; applying a seal to the composite parts and the tooling surface to form a sealed portion between the composite parts and the tooling surface at a welding joint of the composite parts, the seal to provide the sealed portion in communication with the tooling surface and a non-sealed portion in communication with the cavity; producing a magnetic field at the welding joint; and providing a vacuum to the tooling surface defined by a perimeter of the sealed portion during a thermoplastic welding operation.

Another example method includes positioning a smart susceptor between a first composite part and second composite part; positioning the first composite part, the second composite part and the smart susceptor in a cavity defined by a tooling surface of a thermoplastic welding apparatus; applying a tape to a perimeter of the first composite part and the second composite part and only to a portion of the tooling surface about perimeter edges of the first composite part and the second composite part to form a gas seal over a welding joint defined by the smart susceptor and the first and second composite parts; applying a welding pressure to cause the smart susceptor to compress between the first composite part and the second composite part; and generating a first magnetic field adjacent the smart susceptor via a first inductor provided adjacent the tooling surface.

Another example method includes positioning a smart susceptor between opposing surfaces of at least two composite parts; positioning the composite parts and the smart susceptor on a tooling surface defining a cavity of the welding tool; sealing a perimeter of the composite parts and a portion of the tooling surface adjacent the perimeter of the composite parts to provide a sealed portion in communication with the tooling surface and a non-sealed portion in communication with the cavity; applying a pressure differential to a weld joint of the composite parts between the sealed portion and the non-sealed portion to compress the smart susceptor between the composite parts during a welding operation; and generating a magnetic flux field oriented generally parallel to a plane of the smart susceptor during the welding operation.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
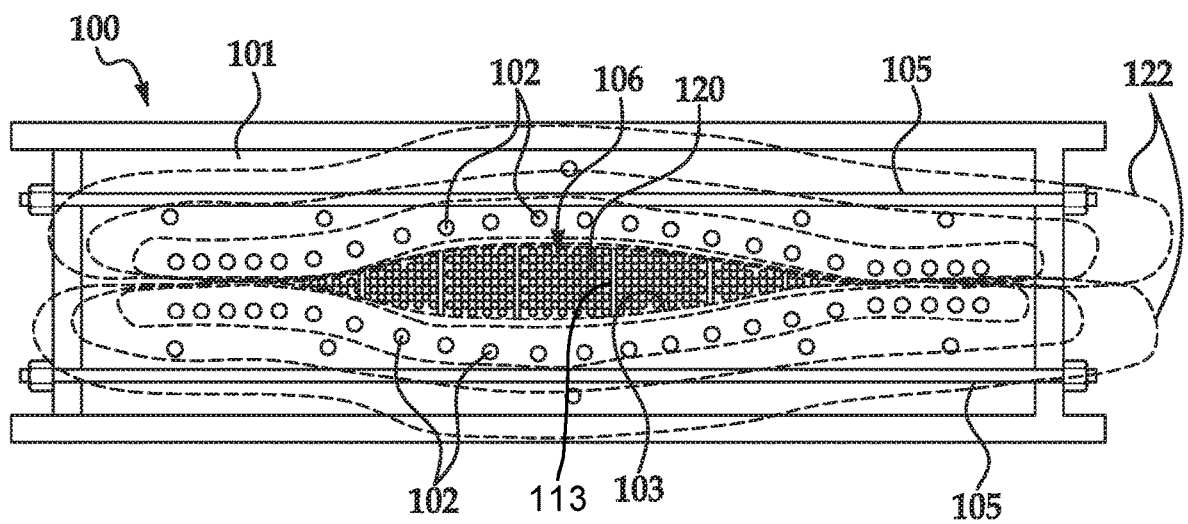
FIG. 1 is a cross-sectional view of an illustrative embodiment of the thermoplastic welding apparatus in exemplary application of the apparatus.
Figure 2:
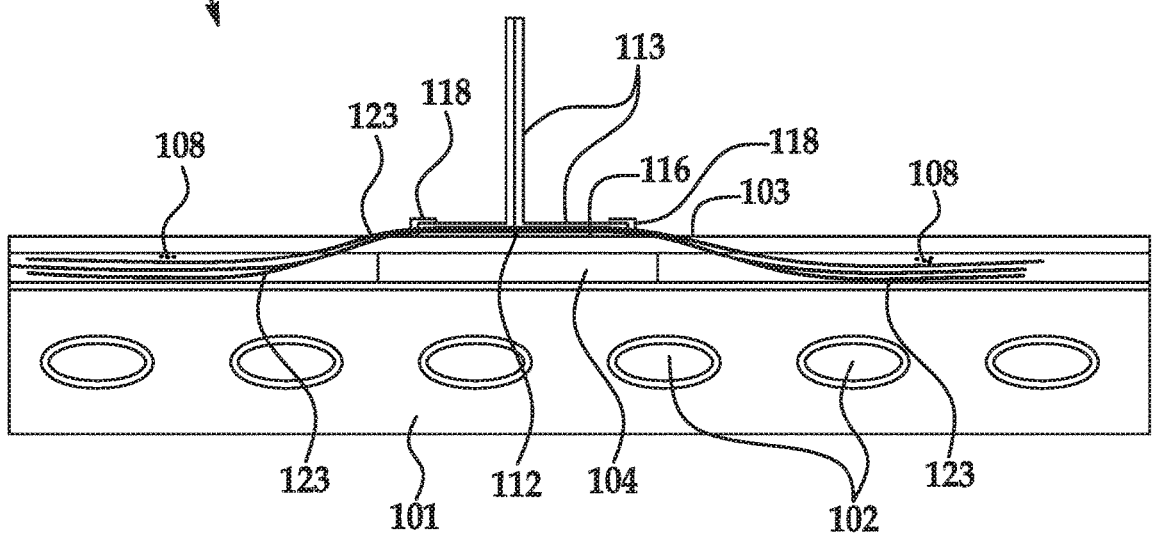
FIG. 2 is a cross-sectional view of a portion of an illustrative embodiment of the thermoplastic welding apparatus of FIG. 1, more particularly illustrating parallel orientation of a magnetic flux field with a smart susceptor between adjacent composite parts in thermoplastic welding of the parts to each other.
Figure 3:
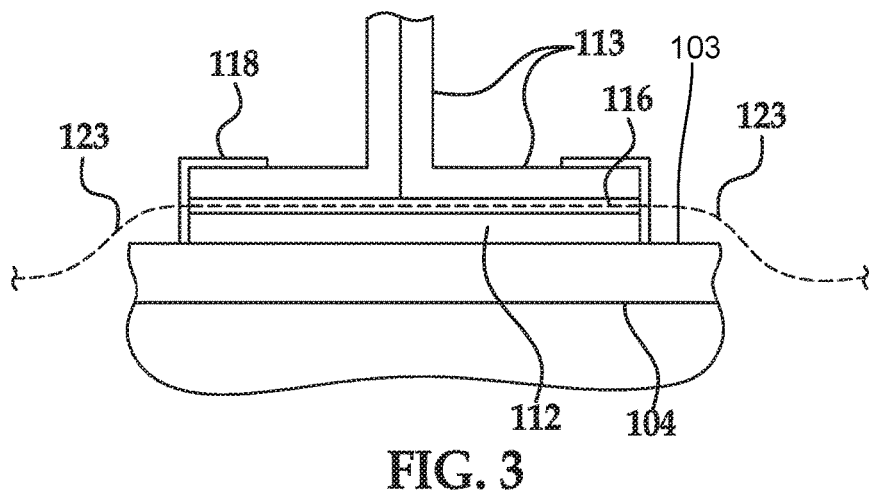
FIG. 3 is an enlarged sectional view of the composite parts and the smart susceptor illustrated in FIG. 2.

Referring initially to FIGS. 1-3, an illustrative embodiment of the thermoplastic welding apparatus is generally indicated by reference numeral 100. The thermoplastic welding apparatus 100 may include a thermoplastic welding tool 101. In some embodiments, the thermoplastic welding tool 101 may be a castable ceramic tool. Reinforcing rods 105, which may be fiberglass, may extend through the thermoplastic welding tool 101.

The thermoplastic welding tool 101 may include a tooling space 106 having at least one tooling surface 103. Magnetic induction coils 102 may extend through the thermoplastic welding tool 101. The magnetic induction coils 102 may be disposed on both sides of the tooling space 106 and may generally surround or envelope the tooling surface 103.

A non electrically-conductive material 104 (FIG. 2) may be disposed generally beneath or adjacent to the tooling surface 103. In some embodiments, the non electrically-conductive material 104 may be an elastomeric material. A ferrite material such as ferrite powder 108, for example and without limitation, may be embedded in the thermoplastic welding tool 101 on at least one side and preferably, on respective sides of the non electrically-conductive material 104. The ferrite powder 108 may be distributed in a plane which is generally parallel to the plane of the smart susceptor 116 and the planes of the first composite part 112 and the second composite part 113, respectively.

In application of the thermoplastic welding apparatus 100, a first composite part 112 is placed on the tooling surface 103 in the tooling space 106 of the thermoplastic welding tool 101. A smart susceptor 116 is placed on the first composite part 112. The smart susceptor 116 may be an electrically-conductive, magnetic metal with high thermal conductivity such as molypermalloy, for example and without limitation. A second composite part 113 is placed on the smart susceptor 116. In some applications, tape 118 may be applied to the edges of the second composite part 113 to form a gas seal over the welding joint defined by the first composite part 112, the smart susceptor 116 and the second composite part 113. A vacuum is pulled on the tooling surface 103 and internal gas pressure 120 applies welding pressure against the second composite part 113, compressing the smart susceptor 116 between the first composite part 112 and the second composite part 113.

The magnetic induction coils 102 generate a magnetic flux field 122 which generally envelopes the first composite part 112 and the second composite part 113, as shown in FIG. 1. In some applications, the magnetic flux field 122 may be an 80 kHz field with 10 amps excitation energy. Due to the high magnetic permeability of the smart susceptor 116, the magnetic flux lines 123 of the magnetic flux field 122 stream into the smart susceptor 116. The ferrite powder 108 focuses the magnetic flux field 122 and eliminates leakage of the magnetic flux field 122 into the first composite part 112 and the second composite part 113. Accordingly, the magnetic flux lines 123 of the magnetic flux field 122 follow the magnetic path of least resistance through the embedded ferrite powder 108 and the smart susceptor 116, as shown in FIG. 3. Consequently, the magnetic flux field 122 sustains a thermal reaction in the smart susceptor 116, heating the smart susceptor 116 to its Curie temperature point. The smart susceptor 116 heats and melts the resin at the welding interface between the first composite part 112 and the second composite part 113. Because the magnetic flux lines 123 of the magnetic flux field 122 encompass the entire part and are oriented parallel to the plane of the smart susceptor 116, minimal heating of the first composite part 112 and the second composite part 113 occurs and heating is focused, concentrated or localized to the welding interface between the first composite part 112 and the second composite part 113. The magnetic induction coils 102 are then turned off and the first composite part 112 and the second composite part 113 allowed to cool. The melted resin at the welding interface solidifies, forming an adhesive bond between the first composite part 112 and the second composite part 113. The composite structure which includes the first composite part 112 and the second composite part 113 may then be removed from the thermoplastic welding tool 101.

It will be appreciated by those skilled in the art that a 0.006" thick molypermalloy smart susceptor 116 is capable of being heated from room temperature to about 670 degrees F. in about 3 minutes when exposed to a 80 kHz magnetic flux field 122 with an equilibrium temperature in the 670-680 degree F. temperature range. A graphite/epoxy composite part 112, 113 does not heat noticeably when exposed to the same magnetic flux field 122. This characteristic enables thin, intrinsically-controlled susceptor materials to be used for thermoplastic composite welding to facilitate even or precise heating and repeatable processing.

Figure 4:
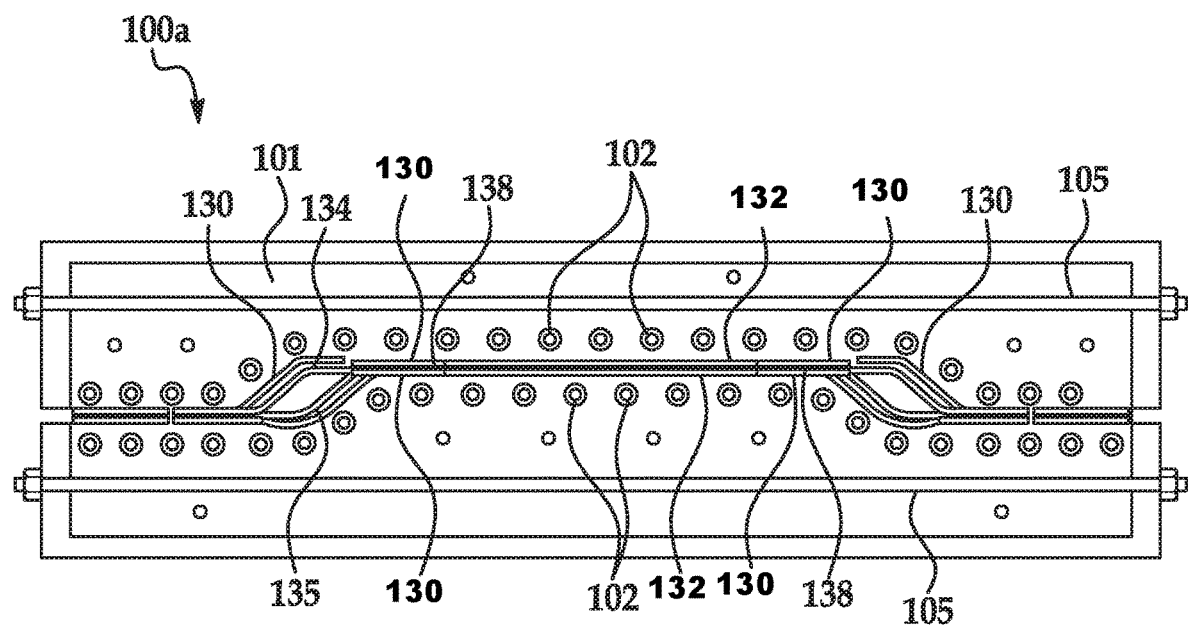
FIG. 4 is a cross-sectional view of an illustrative embodiment of the thermoplastic welding apparatus in alternative application of the apparatus.
Figure 5:
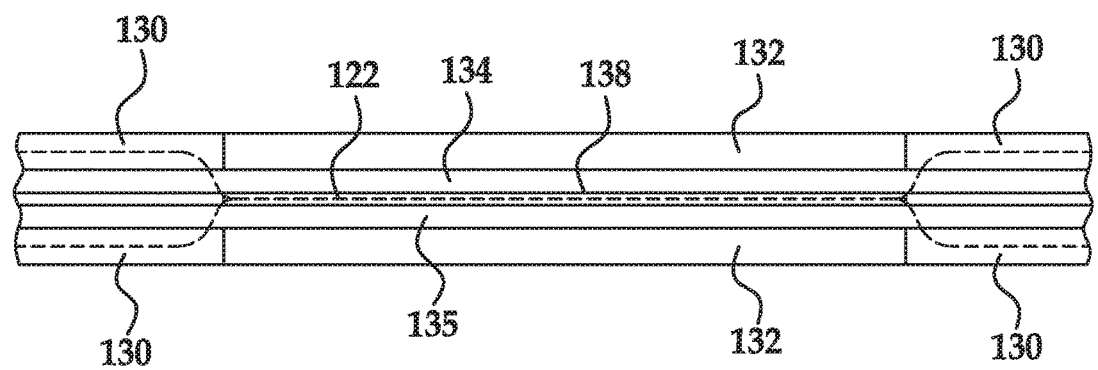
FIG. 5 is an enlarged sectional view of the composite parts and the smart susceptor illustrated in FIG. 4.

Referring next to FIGS. 4 and 5, a cross-sectional view of an illustrative embodiment of the thermoplastic welding apparatus 100a in alternative application of the apparatus is shown. In application of the thermoplastic welding apparatus 100a, multiple smart susceptors 138 may be placed between a first composite part 134 and a second composite part 135 at selected intervals in the thermoplastic welding tool 101 depending on the desired locations of the welding interfaces between the parts. A non electrically-conductive material such as an elastomeric material 132, for example and without limitation, may extend adjacent to the first composite part 134 and the second composite part 135, respectively. A ferrite material 130 may be provided in the thermoplastic welding tool 101 generally on respective sides of the elastomeric material 132. The ferrite material 130 may be oriented in a plane which is generally parallel to the plane of the smart susceptor 108 and the planes of the first composite part 134 and the second composite part 135, respectively. Accordingly, upon energizing of the magnetic induction coils 102, the magnetic flux field 122 (FIG. 5) follows the path of least magnetic resistance through the ferrite material 130 and the smart susceptor 138. The smart susceptor 138 uniformly and selectively heats the welding interface between the first composite part 134 and the second composite part 135 without heating the first composite part 134 and the second composite part 135. Upon cooling, the melted resin at the welding interface solidifies and secures the parts to each other, after which the composite structure including the first composite part 134 an the second composite part 135 is removed from the thermoplastic welding tool 101.

Figure 6:
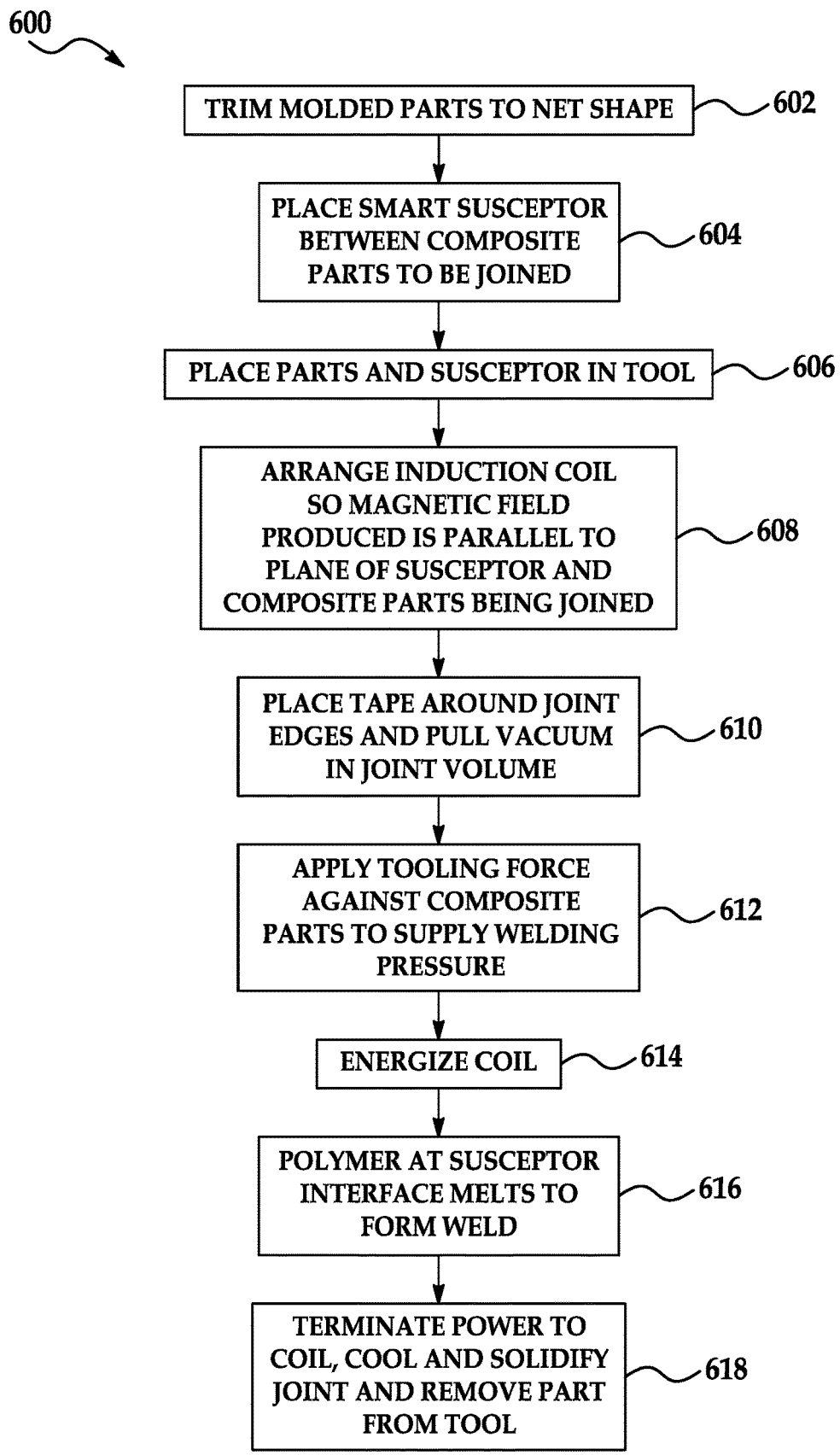
FIG. 6 is a flow diagram of an illustrative embodiment of a thermoplastic welding method.

Referring next to FIG. 6, a flow diagram 600 of an illustrative embodiment of a thermoplastic welding method is shown. In block 602, molded composite parts may be trimmed to net shape. In block 604, a smart susceptor may be placed between the composite parts which are to be joined via thermoplastic welding. In block 606, the composite parts and the susceptor may be placed in a thermoplastic welding tool. In block 608, magnetic induction coils of the tool may be arranged so that a magnetic flux field produced by the induction coils in the tool encompasses the entire part and is oriented parallel to the plane of the smart susceptor and parallel to the planes of the composite parts being joined. In block 610, tape may be placed around the joint edges of the composite parts and a vacuum may be pulled at the joint. In block 612, tooling force may be applied against the composite parts to supply welding pressure. In some embodiments, the tooling force may be a pressurized gas. In block 614, the induction coil may be energized. In block 616, polymeric material at the welding interface between the composite parts may melt to form the weld. In block 618, power to the coil may be terminated to cool and solidify the joint and the composite structure may be removed from the tool.

Figure 7:
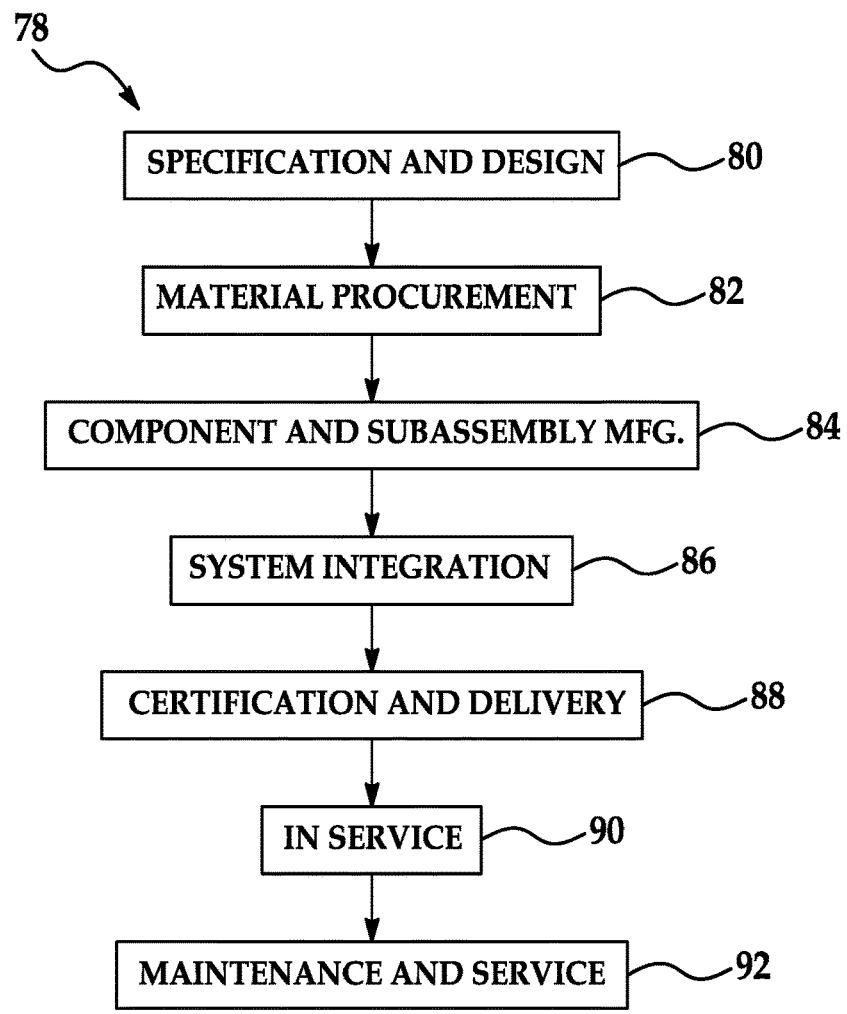
FIG. 7 is a flow diagram of an aircraft production and service methodology.
Figure 8:
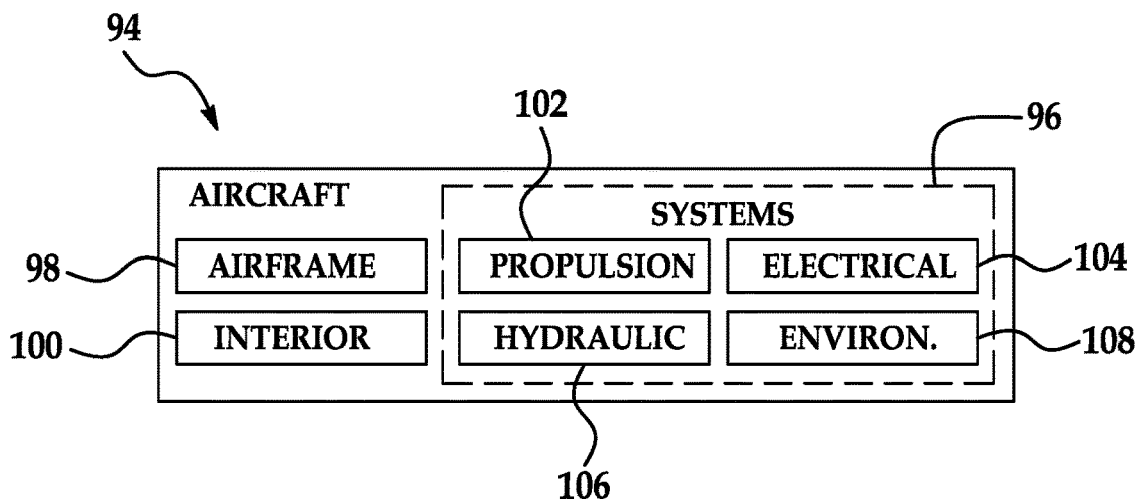
FIG. 8 is a block diagram of an aircraft.

Referring next to FIGS. 7 and 8, embodiments of the disclosure may be used in the context of an aircraft manufacturing and service method 78 as shown in FIG. 7 and an aircraft 94 as shown in FIG. 8. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

The invention claimed is:

1. A method comprising:
    providing a smart susceptor between a first composite part and a second composite part that are to be joined via thermoplastic welding;
    positioning the first and second composite parts and the smart susceptor on a tooling surface within a cavity of a tooling apparatus;
    forming a gas seal over a welding joint defined by the first composite part, the second composite part and the tooling surface, the gas seal to provide a sealed portion in communication with the tooling surface and a non-sealed portion in communication with the cavity;
    producing a magnetic field at the welding joint; and
    providing a vacuum, during a thermoplastic welding operation, to only a portion of the composite parts located within a perimeter of the sealed portion defining the welding joint.

2. The method of claim 1, wherein forming the gas seal includes applying tape to edges of the second composite part when the first and second composite parts are positioned on the tooling surface of the tooling apparatus.

3. The method of claim 1, further comprising applying a pressure to the first and second composite parts positioned in the non-sealed portion in communication with the cavity that is greater than the vacuum applied to the first and second composite parts positioned inside of the sealed portion to provide a welding pressure to compress the smart susceptor between the composite parts during the thermoplastic welding operation.

4. The method of claim 1, wherein producing the magnetic field includes generating a magnetic field that is oriented substantially parallel to a plane of the smart susceptor and planes of the first and second composite parts to be joined via thermoplastic welding.

5. The method of claim 4, further comprising positioning a ferromagnetic material adjacent the cavity to direct a magnetic field flux to the smart susceptor and reduce leakage of the magnetic field flux to the first and second composite parts.

6. The method of claim 5, further comprising positioning a non-electrically conductive material in the cavity of the tooling surface adjacent at least one of the first and second composite parts.

7. The method of claim 6, further including positioning a ferromagnetic material in the tooling surface adjacent the non-electrically conductive material.

8. The method of claim 4, wherein generating the magnetic field in parallel relationship to the plane of the smart susceptor includes placing a non-electrically conductive material in contact with the at least one of the first and second composite parts and providing at least one ferrite material adjacent the non-electrically conductive material.

9. The method of claim 1, further comprising applying a tooling force to compress the smart susceptor between the first and second composite parts during welding.

10. The method of claim 1, wherein providing the vacuum to the portion of the tooling surface defined within the perimeter of the sealed portion provides a pressure differential between the sealed portion and the non-sealed portion to compress the smart susceptor between the first and second composite parts while the vacuum is applied to the welding joint.

11. A method comprising:
positioning a smart susceptor between a first composite part and second composite part;
positioning the first composite part, the second composite part and the smart susceptor in a cavity defined by a tooling surface of a thermoplastic welding apparatus;
applying a tape to a perimeter of the first composite part and the second composite part and only to a portion of the tooling surface at perimeter edges of the first composite part and the second composite part to form a gas seal over a welding joint defined by the smart susceptor and the first and second composite parts;
applying a welding pressure only to the portions of the first composite part and the second composite part located within the perimeter defined by the tape to cause the smart susceptor to compress between the first composite part and the second composite part, wherein the applying the welding pressure includes generating a pressure differential between the cavity and the gas seal by providing a vacuum only to the tool surface located inside of the perimeter defined by the tape and providing a gas pressure outside of the perimeter defined by the tape that is greater than the vacuum; and
generating a first magnetic field adjacent the smart susceptor via a first inductor provided adjacent the tooling surface.

12. The method of claim 11, wherein the vacuum enables the parts and the smart susceptor to be held in contact at the welding joint when the parts are being welded together.

13. The method of claim 11, further including generating a second magnetic field adjacent the smart susceptor via a second magnetic inductor.

14. The method of claim 11, further including applying the tape to the first and second composite parts and the tooling surface such that the tape forms an L-shape.

15. The method of claim 14, further including attaching a first leg of the tape to a first side surface of the first composite part and a first side surface of the second composite part, and attaching a second leg of the tape to the portion of the tooling surface adjacent the first and second composite parts.

16. A method comprising:
positioning a smart susceptor between opposing surfaces of a first composite part and a second composite part;
positioning the first and second composite parts and the smart susceptor on a tooling surface defining a cavity of a welding tool;
sealing a perimeter of the first and second composite parts and a portion of the tooling surface adjacent the perimeter of the first and second composite parts to provide a gas seal over a welding joint, the welding joint defining a sealed portion in communication with the tooling surface and a non-sealed portion in communication with the cavity;
applying a vacuum to the welding joint of the first and second composite parts during a welding operation; and
generating a magnetic flux field oriented generally parallel to a plane of the smart susceptor during the welding operation.

17. The method of claim 16, wherein applying the vacuum includes applying the vacuum in the sealed portion and applying a pressure in the non-sealed portion that is greater than the vacuum.

18. The method of claim 16, wherein sealing the perimeter includes applying a tape to the perimeter of the composite parts and the portion of the tooling surface adjacent the perimeter of the first and second composite parts, the tape forming the sealed portion at the perimeter of the first and second composite parts and the portion of the tooling surface on which the first and second composite parts are positioned.

19. The method of claim 16, wherein positioning the smart susceptor between the first and second composite parts includes placing a molypermalloy between the opposing surfaces of the first and second composite parts.

* * * * *